United States Patent
Poe

(10) Patent No.: US 7,633,410 B2
(45) Date of Patent: Dec. 15, 2009

(54) WIRELESS ASSISTED RECOVERY SYSTEMS AND METHODS

(75) Inventor: John J. Poe, Woodinville, WA (US)

(73) Assignee: Honeywell International Inc., Morristown, NJ (US)

( * ) Notice: Subject to any disclaimer, the term of this patent is extended or adjusted under 35 U.S.C. 154(b) by 227 days.

(21) Appl. No.: 11/163,744

(22) Filed: Oct. 28, 2005

(65) Prior Publication Data

US 2006/0038720 A1 Feb. 23, 2006

Related U.S. Application Data

(63) Continuation-in-part of application No. 10/782,055, filed on Feb. 19, 2004, now Pat. No. 7,098,810.

(60) Provisional application No. 60/653,800, filed on Feb. 16, 2005.

(51) Int. Cl.
*G08B 23/00* (2006.01)
*G01C 5/00* (2006.01)
*G08G 1/16* (2006.01)
*G05D 1/00* (2006.01)

(52) U.S. Cl. .................. 340/963; 701/9; 701/11; 701/301; 244/197

(58) Field of Classification Search .......... 244/75.1, 244/76 R, 174–197, 78.1, 78.2, 79–82, 76 A, 244/76 B, 76 C, 76 J, 181; 701/3–18, 300–302, 701/1, 2; 340/945–983; 342/29–40, 410–413
See application file for complete search history.

(56) References Cited

U.S. PATENT DOCUMENTS

| 3,860,800 | A | * | 1/1975 | Simpson | 701/18 |
| 3,946,358 | A | * | 3/1976 | Bateman | 340/970 |
| 4,442,490 | A | * | 4/1984 | Ross | 701/5 |
| H628 | H | * | 4/1989 | McIngvale | 342/33 |
| 4,924,401 | A | * | 5/1990 | Bice et al. | 701/6 |
| 5,657,009 | A | * | 8/1997 | Gordon | 340/968 |
| 5,786,773 | A | * | 7/1998 | Murphy | 340/947 |
| 6,127,944 | A | * | 10/2000 | Daly et al. | 340/963 |

(Continued)

FOREIGN PATENT DOCUMENTS

EP 1369665 A2 12/2003

(Continued)

OTHER PUBLICATIONS

Clark E Cohen et al., Automatic Landing of a 737 using GNSS Itegrity Beacons, Stanford University, presented at ISPA, Braunschweig Germany, Feb. 1995.*

*Primary Examiner*—Jennifer Mehmood

(57) ABSTRACT

Systems and methods for assisted recovery. An example method receives at least one of a directional or pitch command signal. Localizer or glide slope signals are generated based on the received signal. The localizer or glide slope signals are wirelessly transmitted via a predefined frequency over a transmitter and received at receivers of a navigation system. The vehicle is controlled based on the received signals. A proximity warning device generates an alert when the aircraft is within an alert distance from at least one of terrain, obstacle or special use airspace and an assisted recovery component generates the directional and pitch command signals based on the generated alert and a time delay.

6 Claims, 3 Drawing Sheets

U.S. PATENT DOCUMENTS

| | | |
|---|---|---|
| 6,317,690 B1 | 11/2001 | Gia |
| 6,480,789 B2 * | 11/2002 | Lin .......................... 701/301 |
| 6,675,076 B1 | 1/2004 | Moody |
| 6,748,325 B1 * | 6/2004 | Fujisaki .................... 701/301 |
| 6,778,906 B1 * | 8/2004 | Hennings et al. ........... 701/301 |
| 7,295,134 B2 * | 11/2007 | Jourdan et al. ............. 340/963 |
| 2003/0093193 A1 * | 5/2003 | Pippenger .................... 701/3 |
| 2003/0128122 A1 * | 7/2003 | Reynolds ................. 340/573.1 |
| 2004/0059504 A1 | 3/2004 | Gray |
| 2004/0215372 A1 | 10/2004 | Bateman et al. |
| 2005/0073440 A1 | 4/2005 | Jourdan et al. |
| 2005/0075763 A1 | 4/2005 | Brigode |
| 2006/0038720 A1 | 2/2006 | Poe |

FOREIGN PATENT DOCUMENTS

| | | |
|---|---|---|
| WO | 2006098945 A | 9/2006 |

* cited by examiner

WIRELESS ASSISTED RECOVERY SYSTEMS AND METHODS

CROSS-REFERENCE TO RELATED APPLICATIONS

This application is a Continuation-in-Part of U.S. patent application Ser. No. 10/782,055, filed Feb. 19, 2004 now U.S. Pat. No. 7,098,810, which is hereby incorporated by reference.

This application claims priority to U.S. Provisional Patent Application Ser. No. 60/653,800 filed on Feb. 16, 2005 and is incorporated herein by reference.

BACKGROUND OF THE INVENTION

When pilot and flight crew become unobservant to ground proximity or other warnings due to attention drawn to handling other situations or emergencies, the pilot and flight crew may fail to react in a timely manner. One solution for resolving situations of this nature includes sending instructions to an auto pilot or flight control system that would provide commands to the flight controls in order to avoid the obstacles. However, there exists no standard interface between warning systems and auto pilots. Thus, it is very expensive to outfit a fleet of aircraft that includes various different types of avionic packages.

Therefore, there exists a need to provide a standard and inexpensive interface to allow communication between a warning system and an auto pilot system.

BRIEF SUMMARY OF THE INVENTION

The present invention includes systems and methods for assisted recovery. An example method receives at least one of a directional or pitch command signal. Localizer or glide slope signals are generated based on the received signal. The localizer or glide slope signals are wirelessly transmitted via a predefined frequency over a transmitter and received at receivers of a navigation system. The vehicle is controlled based on the received signals.

Upon detection of a "threat" an Assisted Recovery System (ARS) generates signals that are sent to a Wireless Assisted Recovery System (WAR).

In one embodiment the WAR generates appropriately modulated RF signals for Localizer and Glide Slope Navigation Receivers (ILS).

In another embodiment the WAR generates RF signals that are received and used by other navigation receivers, such as GPS Navigation Receivers.

The ILS includes Localizer and Glide Slope systems.

In another embodiment, the vehicle is an aircraft, a surface vehicle, or a subsurface vehicle.

In still another embodiment, a proximity warning device generates an alert when the aircraft is within an alert distance from at least one of terrain, obstacle or special use airspace and an assisted recovery component generates the directional and pitch command signals based on the generated alert and a time delay.

BRIEF DESCRIPTION OF THE SEVERAL VIEWS OF THE DRAWING

The preferred and alternative embodiments of the present invention are described in detail below with reference to the following drawings.

DETAILED DESCRIPTION OF THE INVENTION

Figure 1:
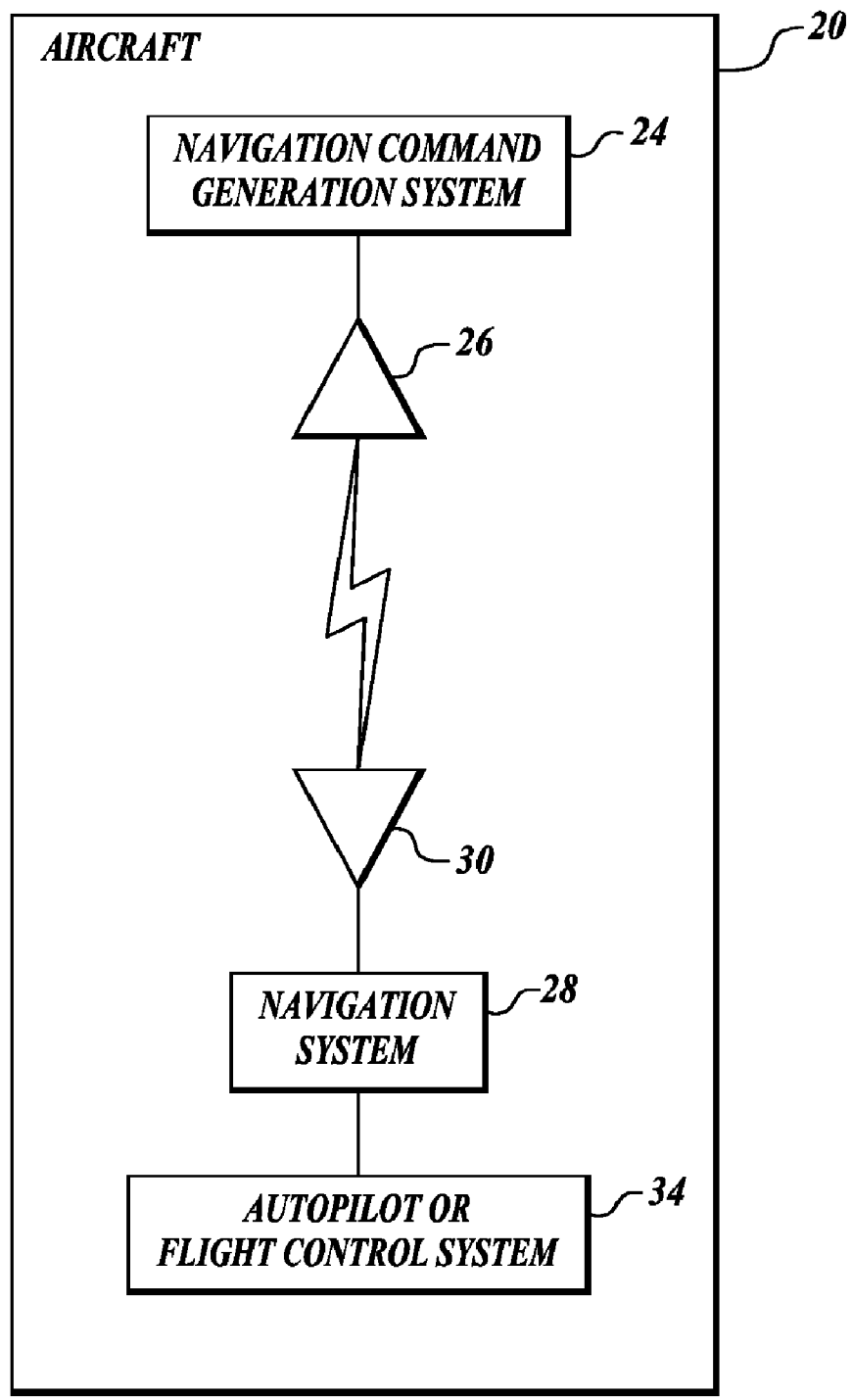
FIGS. 1 and 2 are block diagrams of components of the present invention.

FIG. 1 illustrates example components included within an aircraft 24 for performing the present invention. The aircraft 20 includes a navigation command generation system 24 with a transmit antenna 26, a navigation system 28 with a receive antenna 30, and an auto pilot or flight control system 34.

The navigation command generation system 24 generates one or more navigation signals and wirelessly transmits the generated signals to the navigation system 28 via the transmit antenna 26 and the receive antenna 30. In this example, the auto pilot or flight control system 34 is designed to fly based on navigation signals or instructions generated by the navigation system 28. The navigation system 28 (e.g. Instrument Landing System (ILS)) generates navigation instructions based on the signals received from the navigation command generation system 24. Because the navigation system 28 and receive antenna 30 are typically standard on aircraft that include ILS equipment or comparable equipment, the components described above can be inexpensively implemented on these type of aircraft, because the navigation system 28 already includes standardized ILS signal processing components.

Figure 2:
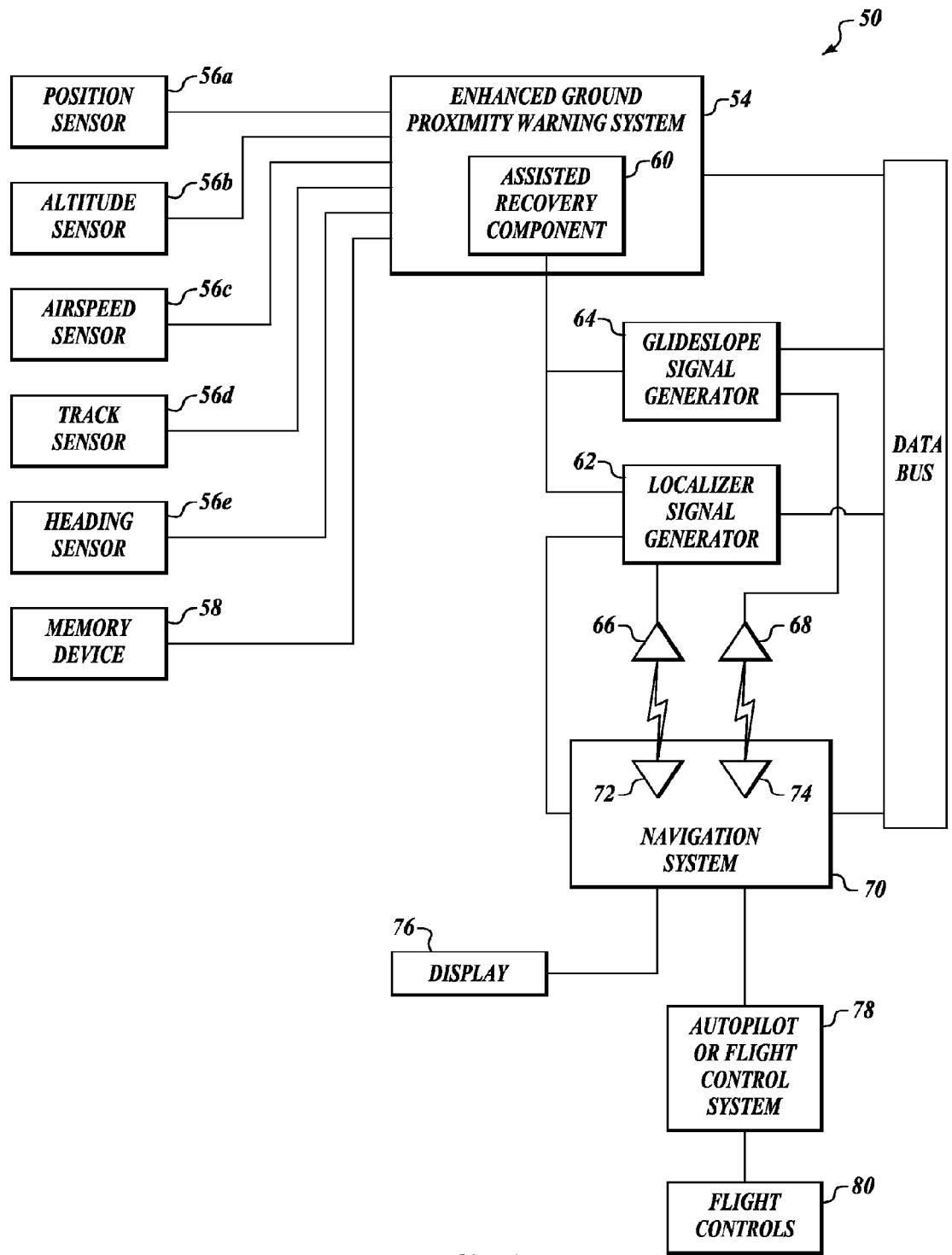

FIG. 2 illustrates an example embodiment of the system shown in FIG. 1. In this example, a system 50 includes the navigation command generation system 24 (FIG. 1) that includes an enhanced ground proximity warning system (EGPWS) 54, a plurality of sensors 56a-e, a memory device 58, a localizer signal generator 62, and a glide slope signal generator 64. The EGPWS 54 is in data communication with the sensors 56a-e, the memory device 58 and the generators 62 and 64. The memory device 58 includes amongst other things a terrain and obstacle database. The sensors shown in 56a-e can be physical sensors located on the aircraft, or the information could be coming from a GPS receiver. The sensor 56c in the case of GPS would actually be a ground speed sensor. Likewise heading information from a GPS is computed using track and mag dev/var. In most cases, the EGPWS has the sensors shown and GPS as well.

The EGPWS 54 includes hardware and software components for determining the aircraft's position relative to terrain, obstacles and protected or restricted airspace and for generating alerts based on the determination. The EGPWS 54 also includes an assisted recovery component 60. The assisted recovery component 60 generates a direction signal and/or altitude signal. The direction signal is a direction that the assisted recovery component 60 desires that the aircraft fly in order to avoid any identified obstruction, such as terrain, man-made obstacle or protected airspace. The altitude signal generated by the assisted recovery component 60 is an altitude value that would allow the aircraft to avoid the identified terrain, obstacle, or airspace. An example assisted recovery component 60 is described in U.S. patent application Ser. No. 10/782,055.

The localizer signal generator 62 receives the direction signal from the assisted recovery component 60 and generates a localizer signal that is output through an associated antenna 66 at a previously defined localizer frequency. The glide slope signal generator 64 receives the altitude signal generated by the assisted recovery component 60 and outputs a glide slope signal through an associated antenna 68 according to a previously defined glide slope signal frequency.

The system 50 also includes a Navigation System 70 that includes a localizer antenna 72 and a glide slope antenna 74. The localizer receiver contained within the Navigation System 70 is tuned to receive the signal outputted by the antenna 66. In one embodiment, the glide slope antenna 74 receives the signal outputted by the antenna 68. In one embodiment, tuning signals are generated by the assisted recovery component 60 and then sent along a data bus to the Localizer and Glide slope signal generators 62 and 64, and also to the Navigation System 70. The navigation system 70, which consists of one or more Localizer and Glide Slope receivers, tunes these receivers according to the received tuning signals In one embodiment, additional messages are sent via the data bus to force a Flight Management System (FMS) (not shown) to allow tuning of the radios. In another embodiment, the EGPWS 54 communicates with the FMS to force the FMS to tune the radios and engage the autopilot in an approach mode.

The navigation system 70 includes a component (not shown) that processes the received localizer and glide slope signals as it would if the signals came from a ground-based system. A display device 76 presents the processed localizer and glide slope signals on a display 76. An auto pilot or flight control system 78 (hereinafter autopilot) is in data communication with the navigation system 70. The autopilot 78 is activated or has been previously activated to fly according to the processed localizer and glide slope signals. As such, the autopilot 78 produces flight control signals that are sent to the flight controls 80 for controlling pitch, roll, or yaw or throttle settings of the aircraft in order to maintain course and/or speed relative to the processed localizer and glide slope signals.

Figure 3:
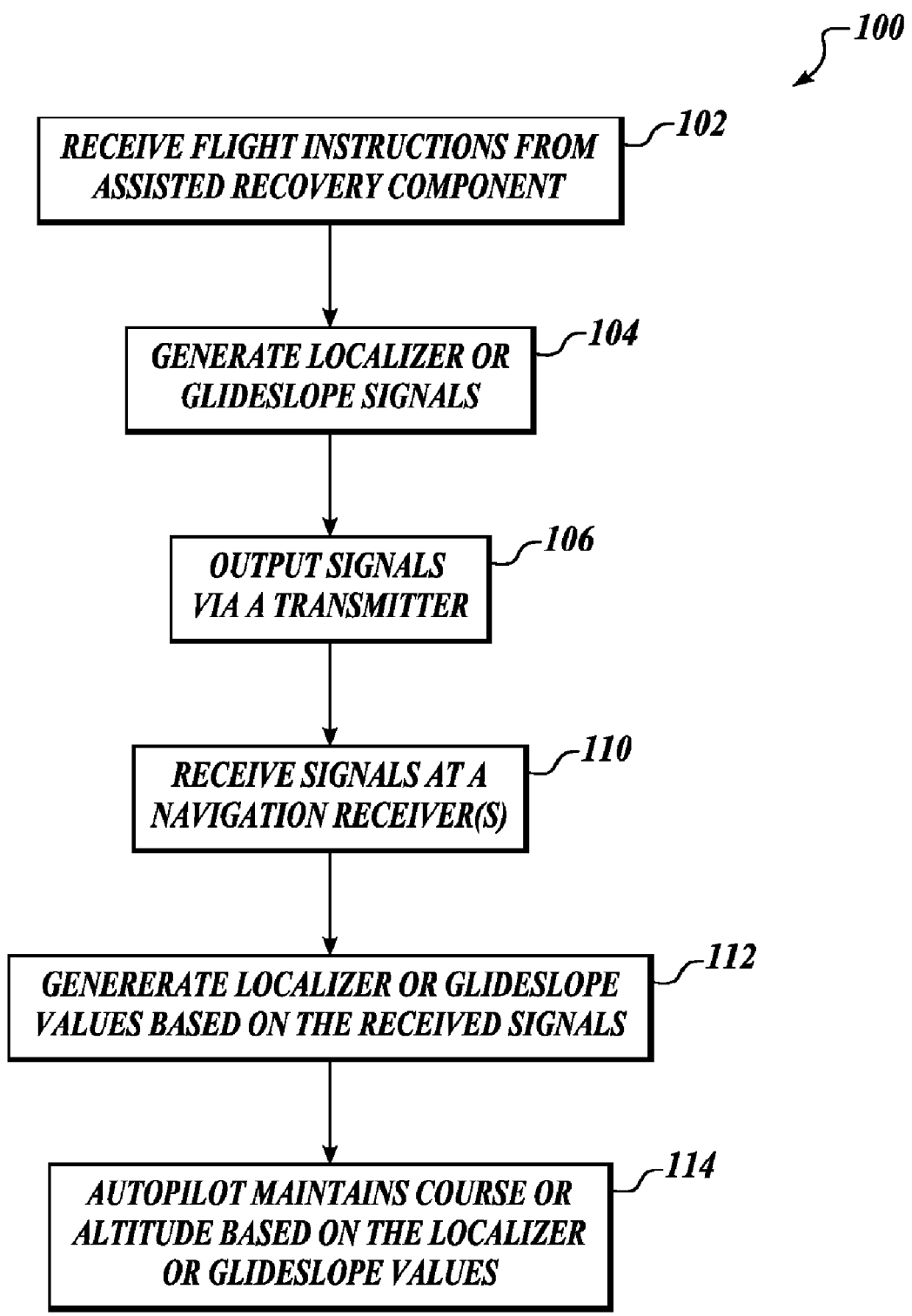
FIG. 3 is a flow diagram of an example process performed by the systems shown in FIGS. 1 and 2.

FIG. 3 illustrates an example process 100 performed by the system 50 shown in FIG. 2. First, at a block 102, flight instructions are received from the assisted recovery component 60. At a block 104, localizer or glide slope signals are generated based on the received flight instructions. At a block 106, the generated localizer or glide slope signals are outputted to the respective transmitters and at a block 110 are received by respective navigation system receivers. At a block 112, localizer or glide slope values are generated based on the received signals. At a block 114, the autopilot maintains course or altitude based on the generated localizer or glide slope values.

In one example, the assisted recovery component 60 determines that the aircraft is to fly a 6° climb and sends a signal to the glide slope signal generator 64 that is a command or navigation instruction to perform a 6° climb. The glide slope signal generator 64 creates a 6° climb ILS glide slope signal.

The assisted recovery component 60 generates a composite signal (a mixture of 90 and 150 Hz.), which is used to amplitude modulate a single transmitter (the generator 64), tuned to a Glide Slope frequency. If it is desired to show the autopilot (or pilot) a centered needle, the transmitter is modulated with equal amplitudes of 90 and 150 HZ. If it is desired to make the aircraft climb, the transmitter is modulated to have the 150 Hz portion predominate. In one embodiment, the autopilot is given a signal indicating "fly up" but since moving the aircraft doesn't change the received signal, the aircraft just continues to climb, trying to center the needle (center the plane on the glideslope).

While the preferred embodiment of the invention has been illustrated and described, as noted above, many changes can be made without departing from the spirit and scope of the invention. For example, the system described can be fully or partially implemented on vehicles other than aircraft, such as ground-based, sea surface or subsurface vehicles. Accordingly, the scope of the invention is not limited by the disclosure of the preferred embodiment. Instead, the invention should be determined entirely by reference to the claims that follow.

What is claimed is:

1. A method performed on a vehicle for assisted recovery, the method comprising:
   receiving at least one of a directional or pitch command signal at an assisted recovery component included in the vehicle;
   generating at least one of a localizer or glide slope signal based on the received signal at the assisted recovery component and one of a localizer or glide slope signal generator;
   generating at the assisted recovery component a tuning signal;
   sending the generated tuning signal to an Instrument Landing System (ILS) and the localizer or glide slope signal generators;
   wirelessly transmitting the at least one localizer or glide slope signal from the localizer or glide slope signal generators to the ILS based on the sent tuning signal;
   at the ILS, generating at least one localizer or glide slope signal based on the wirelessly transmitted at least one localizer or glide slope signal;
   controlling the vehicle based on the ILS generated localizer or glide slope signal,
   wherein the at least one of directional or pitch command signals are generated by the assisted recovery component based on a proximity alert and a time delay.

2. The method of claim 1, further comprising:
   displaying vehicle position relative to the ILS generated localizer or glide slope signal.

3. The method of claim 1, wherein the vehicle includes at least one of an aircraft, a surface vehicle, or a subsurface vehicle.

4. A vehicle comprising:
   a proximity warning device configured to generate an alert when the vehicle is within an alert distance from at least one of terrain, obstacle or special use space;
   an assisted recovery component configured to generate directional or pitch command signals based on the generated alert, generate a tuning signal and send the tuning signal over a databus;
   one or more generators configured to receive at least one of the directional or pitch command signals and the tuning signal, generate at least one of a localizer or glide slope signal based on the received directional or pitch command signals, and wirelessly transmit the generated at least one localizer or glide slope signal based on the tuning signal;
   an Instrument Landing System (ILS) configured to receive the tuning signal, receive the wirelessly transmitted localizer or glide slope signal based on the tuning signal and generate at least one localizer or glide slope signal based on the wirelessly transmitted localizer or glide slope signal;
   a controller configured to control the vehicle based on the localizer or glide slope signal generated by the ILS.

5. The vehicle of claim 4, further comprising:
   a display configured to present vehicle position relative to a flight path or glide slope based on the ILS generated localizer or glide slope signal.

6. The vehicle of claim 4, wherein the vehicle includes at least one of an aircraft, a surface vehicle, or a subsurface vehicle.

* * * * *

UNITED STATES PATENT AND TRADEMARK OFFICE
CERTIFICATE OF CORRECTION

PATENT NO.        : 7,633,410 B2                                        Page 1 of 1
APPLICATION NO.   : 11/163744
DATED             : December 15, 2009
INVENTOR(S)       : John J. Poe It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 82 days.

Signed and Sealed this

Ninth Day of November, 2010

David J. Kappos
*Director of the United States Patent and Trademark Office*